C. H. LAUTH.
ELECTRIC OVEN FOR COOKING PURPOSES.
APPLICATION FILED JUNE 16, 1920.

1,380,656. Patented June 7, 1921.

Inventor
C. H. Lauth
By H. R. Kerslake.
Atty.

UNITED STATES PATENT OFFICE.

CLARENCE HAROLD LAUTH, OF ISLINGTON, LONDON, ENGLAND.

ELECTRIC OVEN FOR COOKING PURPOSES.

1,380,656.  Specification of Letters Patent.  Patented June 7, 1921.

Application filed June 16, 1920. Serial No. 389,472.

*To all whom it may concern:*

Be it known that I, CLARENCE HAROLD LAUTH, A. M. I. E. E., B. Sc., a subject of the King of Great Britain and Ireland, residing at 11 Highbury Mansions, Upper street, Islington, in the county of London, N. 1., England, have invented certain new and useful Improvements in Electric Ovens for Cooking Purposes, of which the following is a specification.

This invention relates to an improved electric oven intended for the cooking of food, preferably by means of an electric current induced in the secondary circuit of a transformer.

The oven constructed according to the present invention comprises a suitable casing or framework within which are mounted two or more suitable electrodes adapted to be brought into direct contact with the substance to be cooked, said electrodes being preferably adapted to be readily detached from the oven for cleaning purposes.

In the oven according to the present invention the current is caused to flow through the mass of the product which has to be cooked, a large part of the heat necessary for this purpose being produced by the currents flowing internally through the body of the product itself.

Additional heat may be provided by means of radiant heat produced by one or more radiant elements placed within the oven and receiving their heating current preferably from the same source of current as that with which the electrodes referred to are associated.

The invention also consists in the improved electric oven hereinafter more particularly described.

Figure 1:
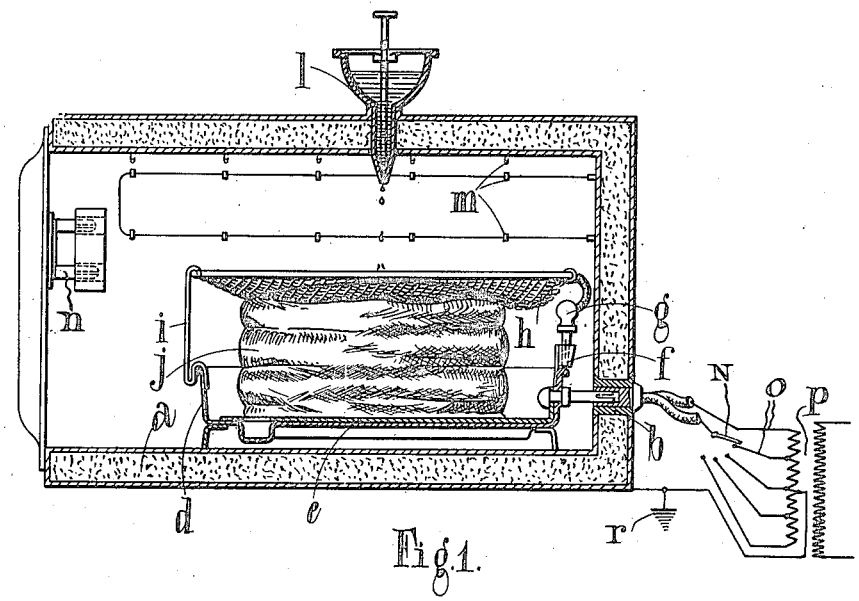
Figure 2:
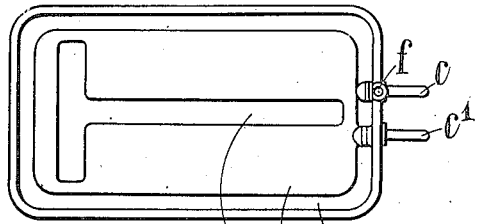
Figure 3:
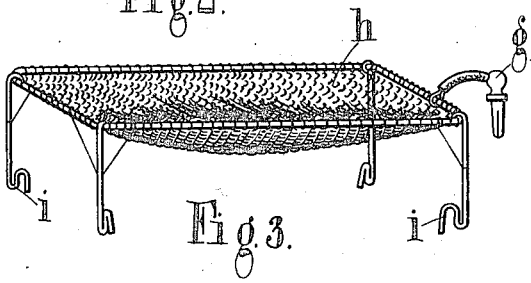

The accompanying drawings illustrate, by way of example, one mode of carrying the invention into effect, Figure 1 being a sectional elevation of the oven, Fig. 2 a plan view of the dish used, and Fig. 3 a perspective view of one of the electrodes.

Referring to the drawings, $a$ is a lagged casing, and $b$ is one of two sockets, which are connected to the source of current, such as the secondary of a transformer, by means of a plug, tumbler, or other switch, and are adapted to receive the terminals $c$ $c^1$ which are attached to the dish $d$ of insulating material, one of these terminals, viz., $c^1$ being electrically connected to a metal bottom $e$ placed in or fixed to the dish $d$, and constituting the one electrode, and the other one, viz., $c$, being electrically connected to a socket $f$ provided on the edge of the dish $d$ and adapted to receive a connecting plug $g$ attached to a chain mail $h$ constituting the second electrode. The framework of the chain mail electrode is supported on the edge of the dish $d$ by means of legs $i$, and the dish is preferably formed with a T-shaped or other depression $k$ to allow of the meat bones protruding, the metal bottom $e$ being in this case provided with a corresponding recess. The drawing also shows, by way of example, a joint $j$ which is placed between the two electrodes $e$ and $h$, the latter being adapted to establish a good contact therewith.

The electrode $h$ may consist of a sheet of chain mail, e. g., about 8" by 10", the current passing from the many points of contact between the meat joint and the chain mail through the joint and into the metal sheet $e$ which constitutes the other electrode, the contact between the joint and the said metal sheet being preferably improved by the presence of a certain amount of gravy or liquid in the dish. A good contact between the top electrode $h$ and the joint, may be maintained by allowing water or dripping to fall thereon in the form of drops controlled by a needle valve $l$, whereby the surface of the meat is prevented from drying up. When dripping is used, this arrangement may also serve for basting purposes without removing the joint or opening the oven. The chain mail which may be made of any suitable metal may be stiffened by means of a plurality of suitable links which are arranged to interengage with links of the chain mail with the object of maintaining the shape of the latter. In addition to the electrical connection between the periphery of the chain mail and the frame thereof with which the plug $g$ is electrically connected, a further electrical connection may be effected by suitable connections, between the frame and the stiffening links which are themselves in electrical contact with the sheet of chain mail.

Although I prefer to make the top electrode $h$ of a sheet of chain mail, it is to be understood that such electrode may consist of any other suitable means, such as metal plates, spikes, chains of links or a flexible fabric of conducting material. Similarly the construction of the bottom electrode may be different from that above referred to. For instance, it may consist of a plain metal dish or of a sheet of metal links placed in, or of spikes provided on, a dish of insulating material.

The casing or framework of the oven is preferably inclosed and provided with a door, the whole being preferably heat insulated so as to avoid waste of heat. Means may be provided for automatically opening the electric circuit when the door is opened, such means may for instance consist of a plug $n$, the pins of which are attached in an insulating manner to the inside of the door, while the socket intended to receive them is secured to one of the walls of the oven.

The heating of the oven by the means hereinbefore referred to may be supplemented by radiant heat obtained by radiant elements $m$ supported in an insulated manner on the inner walls of the oven and preferably consisting of a heating wire which is mounted in a zig-zag manner along the said walls, and is heated by the secondary current of the transformer, or by the ordinary current of the main supply circuit.

In the case of smaller joints, the electrodes may consist of two or more horizontally or vertically opposed conducting plates or the like having clamping means for the purpose of clamping the joint between the plates, the latter being provided or not with spikes or other means for facilitating the passage of the current into the meat.

The heat may be controlled by varying the voltage supplied to the two electrodes $e$ and $h$ in any suitable manner, for instance by a switch $n$ or switches connecting the sockets in the oven of the wall to different tappings $o$ on the transformer $p$. In order to prevent electric shocks the middle point $q$ of the secondary of the transformer and the casing of the oven may be grounded as shown at $r$.

I wish it to be understood that the invention is not limited to the means hereinbefore described for carrying the invention into effect, as the same may be modified in various respects without in any way departing from the spirit of the invention.

What I claim is:

1. An electric oven for cooking solid food comprising a casing having a door for closing the casing and electrodes mounted in the casing and capable of being brought into direct contact with the solid food intended to be cooked, as set forth.

2. An electric oven for cooking solid food as claimed in claim 1, in which the electrodes are readily detachable from the oven, for the purpose set forth.

3. An electric oven for cooking solid food comprising a casing, a lower electrode mounted therein and intended for the solid food to be placed thereon, and an upper electrode intended to be placed on the solid food, the latter electrode consisting of a sheet of chain mail, as set forth.

4. An electric oven for cooking solid food comprising a casing, a lower electrode mounted therein and intended for the solid food to be placed thereon, an upper electrode intended to be placed on the solid food, the former electrode consisting of a metal sheet and a tray of insulating material, in which the metal sheet is placed, as set forth.

5. An electric oven for cooking solid food as claimed in claim 4, in which a depression is provided in the tray and a corresponding recess in the metal sheet, as set forth.

6. An electric oven for cooking solid food as claimed in claim 1, having also radiant elements for providing additional heat in the form of radiant heat as set forth.

7. An electric oven for cooking solid food comprising a casing and electrodes mounted therein and capable of being brought into direct contact with the solid food intended to be cooked, in combination with a transformer having tappings for changing the voltage supplied to the electrodes, as set forth.

8. An electric oven for cooking solid food as claimed in claim 7, having the middle point of the secondary of the transformer and the casing of the oven connected to earth.

9. An electric oven for cooking solid food as claimed in claim 1, having a door for the oven and means for automatically opening the electric circuit when the door is opened.

10. An electric oven for cooking solid food as claimed in claim 1, having means for supplying water, dripping or the like to the contacts between the electrodes and the joint from without the casing of the oven, as and for the purpose set forth.

In testimony whereof I have signed my name to this specification.

CLARENCE HAROLD LAUTH.